Sept. 1, 1964
J. W. RAYMO
3,147,023
TRAILER SUSPENSION SYSTEM
Filed Jan. 24, 1963
2 Sheets-Sheet 1
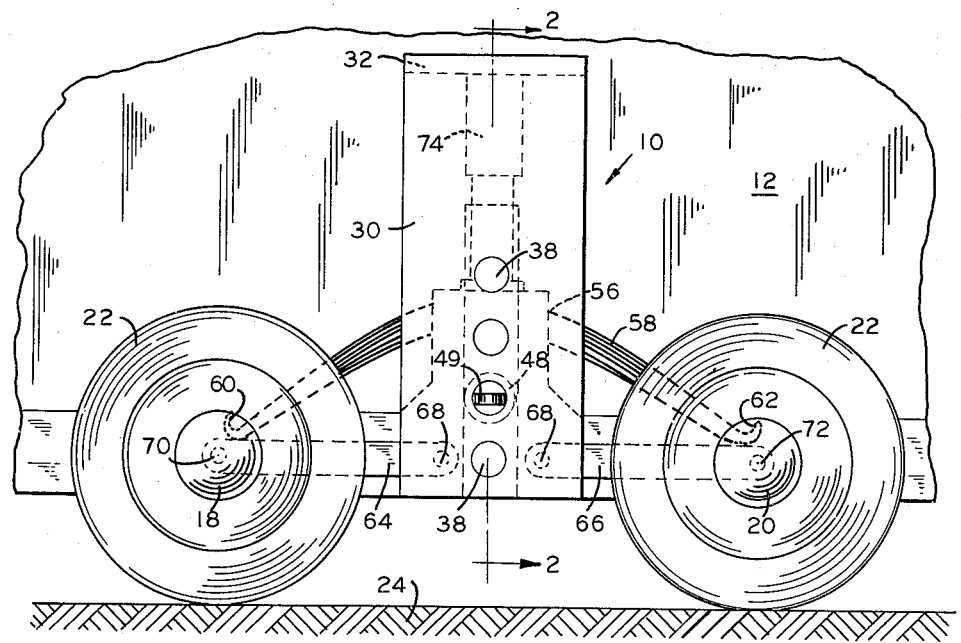
FIG. 1
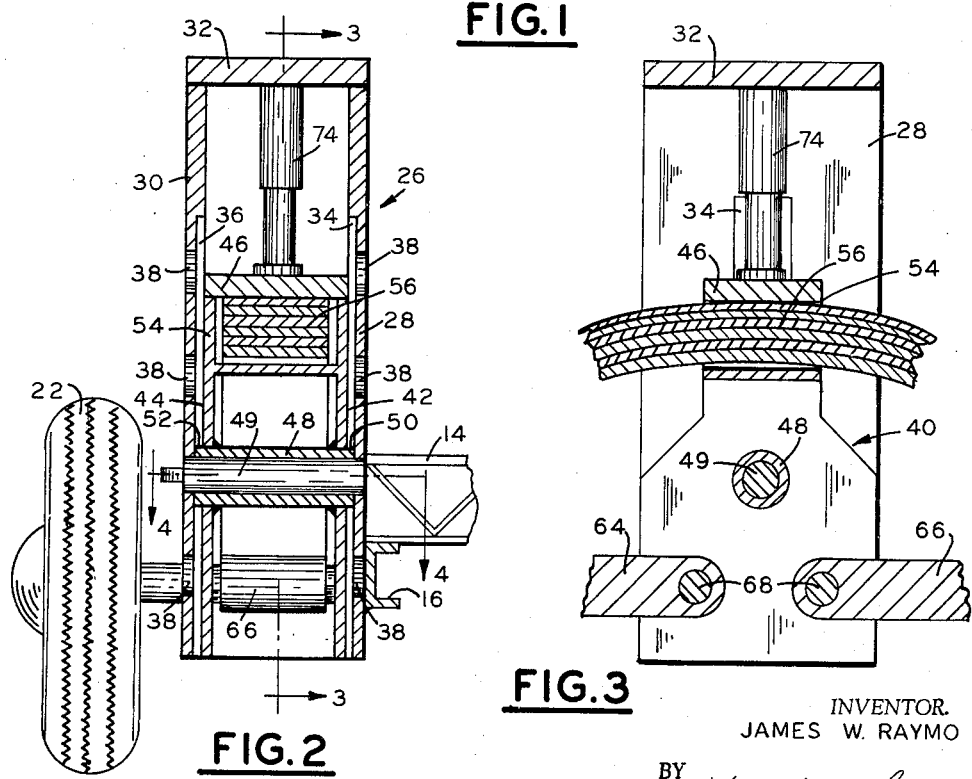
FIG. 2
FIG. 3
INVENTOR.
JAMES W. RAYMO
BY
Head & Johnson
ATTORNEYS Sept. 1, 1964  J. W. RAYMO  3,147,023
TRAILER SUSPENSION SYSTEM
Filed Jan. 24, 1963  2 Sheets-Sheet 2
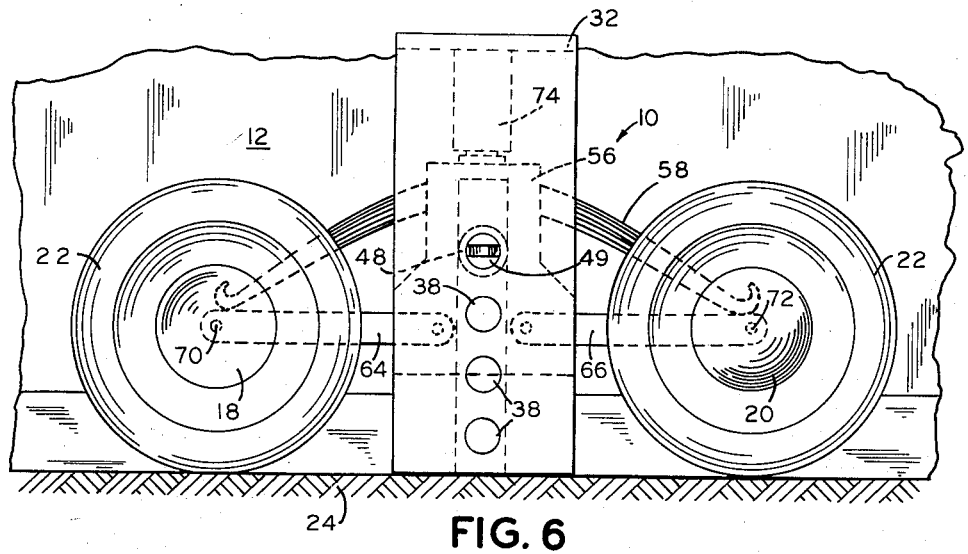
FIG. 6
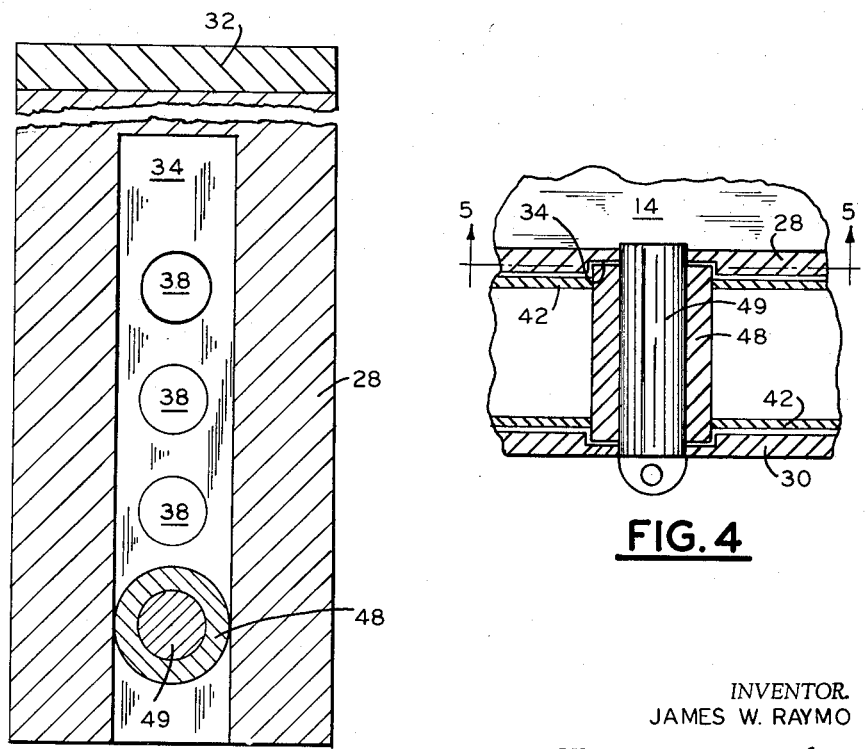
FIG. 5
FIG. 4
INVENTOR.
JAMES W. RAYMO
BY Head & Johnson
ATTORNEYS United States Patent Office 3,147,023
Patented Sept. 1, 1964

3,147,023
TRAILER SUSPENSION SYSTEM
James W. Raymo, 7521 E. 28th St. N., Tulsa, Okla.
Filed Jan. 24, 1963, Ser. No. 253,731
4 Claims. (Cl. 280—43.23)

This invention relates to improvements in trailer suspension systems. More particularly, this invention relates to an improved trailer suspension system for tandem mounting the wheels of a trailer to provide improved cooperative action between the trailer wheels and to provide means for varying the height above the ground of the trailer from a position flush with the ground to a predetermined maximum height.

The present application is a continuation-in-part of co-pending application Serial No. 160,217, filed December 18, 1961, and now abandoned, on suspension system for trailers.

One of the more common trailer suspension systems is termed a "four wheel suspension system." This system utilizes two wheels, arranged in tandem, on each side of the trailer, or a total of four wheels. The spring system of each set of tandem mounted wheels transfers the shock resulting from traveling over uneven terrain back and forth between the wheels to smooth out the trailer ride.

Other trailer suspension systems have been devised providing means for distributing the load back and forth between tandem wheels on each side of the trailer. However, such systems commonly require complicated linkages for transmittal of the weight of the trailer load from one tandem wheel to the other, thereby increasing the expense and difficulty of manufacture and frequency of failure of the suspension system. Furthermore, these more common trailer suspension systems have no means for varying the height above the ground at which the trailer is supported.

It is therefore an object of this invention to provide an improved tandem trailer suspension system that includes means for easily varying the height above the ground at which the trailer is supported.

Another object of this invention is to provide an improved tandem trailer suspension system including means for varying the elevation of the trailer, such means easily adaptable for placing the trailer upon the ground.

Another object of this invention is to provide an improved tandem trailer suspension system in which each of the wheels in a tandem unit are free to move vertically relatively independently of each other resulting in improved riding characteristics to the trailer.

Further objects and advantages of this invention will be apparent from the following description and appended claims, reference being had to the accompanying drawings forming a part of the specification wherein like reference characters designate corresponding parts in the several views.

FIGURE 1 is a side view of a trailer showing the tandem suspension system of this invention applied to one side of the trailer.

FIGURE 2 is a cross-sectional view taken along line 2—2 of FIGURE 1.

FIGURE 3 is a cross-sectional view taken along the line 3—3 of FIGURE 2.

FIGURE 4 is a cross-sectional view taken along line 4—4 of FIGURE 2.

FIGURE 5 is a cross-sectional view taken along line 5—5 of FIGURE 4.

FIGURE 6 is a side view of a trailer equipped with a tandem suspension system of this invention with the trailer lowered onto and supported by the ground thereunderneath.

Referring now to the drawings in general and particularly to FIGURE 1, there is shown the trailer suspension system of this invention, indicated generally by the numeral 10. Trailer suspension system 10 is attached to a trailer 12 in a manner to be described further hereinafter.

As best seen in FIGURE 2, trailer 12 consists of a trussed bottom 14 supported on longitudinal side channel members 16. It must be borne in mind that only one side of the trailer is shown in FIGURE 2. It must be noted that trailer 12 can be any structure having a bottom construction mounted on wheels for rolling movement. Such a structure includes but is not limited to horse trailers, house trailers and trailers used in moving various articles, products and the like.

Trailer 12 is shown equipped with a forward wheel 18 and a rearward wheel 20 supported in a tandem arrangement. Tires 22 on wheels 18 and 20 engage the earth 24 to provide a cushion ride for trailer 12.

Referring again to FIGURE 2, suspension system 10 includes a substantially inverted U-shaped anchor box 26 formed of an inner vertical plate 28 and an outer vertical plate 30, both plates being interconnected at their upper extremities by top plate 32. Anchor box 26 is attached to trailer 12 by welding the lower extremity of inner vertical plate 26 to the trust bottom 14 and longitudinal channel members 16. Other means such as screws, bolts, or the like, not shown, may be used to attach anchor box 26 to the side of trailer 12.

Vertical plates 28 and 30 are provided interiorly with vertical guide grooves 34 and 36, respectively. Plates 28 and 30 are also provided with a plurality of vertically spaced perforations 38, arranged centrally of grooves 34 and 36.

Retainer member 40 is vertically movably retained within anchor box 26 between vertical plates 28 and 30. Retainer member 40 is constructed similarly to anchor box 26, having two vertical parallel side plates 42 and 44 interconnected at their upper extremity by top plate 46.

Tubular members 48 extends transversely through retainer member 40 with its ends 50 and 52 extending slightly beyond side plates 42 and 44. Ends 50 and 52 of tubular member 48 are slidably and rotatably received within vertical grooves 34 and 36 of plates 28 and 30 to restrict movement of retainer member 40 within anchor box 26 to a vertical direction and allow member 40 to pivot relative to anchor box 26 about the axis of tubular member 48.

Retainer member 40 is pivotably attached to anchor box 26 by passing a locking means such as pin 49 through tubular member 48 and perforations 38 aligned therewith.

Retainer member 40 is provided at its upper extremity with a horizontally open ended box-shaped spring saddle 54. The middle portion 56 of a conventional leaf-type spring 58 is retained within said saddle 54 with its end portions 60 and 62 extending forwardly and rearwardly, respectively, thereof in a direction substantially parallel to the length of trailer 12.

Pivotally connected to the lower portion of retainer member 40 is a forward rocker arm 64 which extends generally in the direction of forward movement of trailer 12 and a rearward rocker arm 66 which extends generally in the direction of rearward movement of trailer 12. Rocker arms 64 and 66 are affixed to retainer member 40 with pivot pins 68, and are pivotable in a common plane parallel to the length of trailer 12.

Wheels 18 and 20 are rotatably supported to the free ends of rocker arms 64 and 66, respectively, by cantilevered axles 70 and 72, respectively. Wheels 18 and 20 are rotatable in a common plane parallel to the length of trailer 12.

As seen in FIGURE 1, the forward and rearward ends 60 and 62, respectively, of spring 58 are curved downwardly into contact with the upper surface of the free ends of forward and rearward rocker arms 64 and 66 respectively, near the point of connection of wheels 18 and 20 to these rocker arms, and apply a downwardly biasing force thereto. When an obstruction is encountered by either one of the two wheels, that wheel tends to move upwardly against this downward biasing force of spring 58. In so doing, the rocker arm to which the wheel is attached tends to rotate upwardly at the point of pivotal connection to the retainer member 40, the other wheel in the tandem arrangement remaining relatively unaffected.

It should be noted that due to the fact that retainer member 40 is pivotable within anchor box 26, when one wheel moves upwardly against the biasing force of spring 58, the retainer member 40 will pivot or rotate in a corresponding direction thereby maintaining an even distribution of stresses in both forward and rearward portions of spring 58.

A jack 74 is located in the upper portion of anchor box 26, extending between top plate 32 of anchor box 26 and top plate 46 of retainer member 40. Jack 74 can be of any conventional type capable of raising and lowering an object with a hydraulic jack of the type shown in FIGURES 2 and 3 being preferred.

When it is desired to remove locking pin 49, jack 74 is extended sufficiently to relieve the force exerted by retainer member 40 against locking pin 49, whereupon pin 49 can be easily removed. Also, retainer member 40 can be moved upwardly or downwardly within anchor box 26 by retracting or extending, respectively, the jack 74.

At times it is desirable to lower a trailer into firm contact with the ground, such as for example when loading or unloading a trailer, especially an animal conveying trailer, or to provide a firm footing for a house trailer. It is also sometimes desirable to lower a trailer to a position near the ground but not quite touching it, as for example when pulling a trailer under a low overhead obstruction such as a bridge or an overpass.

The suspension system of this invention allows for quick and easy adjustment of the vertical position of the trailer 12 relative to the ground 24. When it is desired to raise or lower the trailer 12, locking pin 49 is removed and jack 74 is extended or retracted until the desired position of the trailer relative to the ground is obtained with tubular member 48 registering with one of the perforations 38. Locking pin 49 is then replaced within tubular member 48 and perforation 38 to pivotably lock retainer member 40 within anchor box 26.

A similar procedure is followed in lowering trailer 12 into contact with the ground 24 as shown in FIGURE 6. In that position the trailer 12 is solidly supported on the ground 24 and the stresses on spring 58 are totally or at least partially relieved.

The numerous advantages gained by positioning the bottom of a trailer directly on the surface of the ground include the provision of a firm foundation support for the trailer, important for house trailers and the like, and the close proximity of the trailer to the ground, important when loading and unloading animals, products, or similar articles from a transport trailer.

Trailer 12 is easily elevated to a position ready for travel by operation of jack 74, as above described. When jack 74 is of the hydraulic type, trailer 12 can be elevated by the simple and effortless operation of the hydraulic controls located in the tractor (not shown) pulling the trailer.

The improved trailer suspension system of this invention provides means for equally distributing the weight of the trailer between two independently supported tandem arranged wheels. Likewise, this suspension system provides means for effortlessly raising and lowering the trailer relative to the ground.

It should be understood that anchor box 26 could be formed integrally of the chassis of trailer 12 in which case it would be indistinguishable from the trailer itself. Similarly, retainer member 40 could be vertically movably and pivotably attached to trailer 12 thereby deleting anchor box 26 without departing from the spirit and scope of this invention.

As stated above, during movement of trailer 12 retainer member 40 will rock or pivot about the axis of tubular member 48 in response to vertical movement of wheels 18 and 20. In order to prevent any interference with this pivotal movement of retainer member 40, jack 74 will be removed from within anchor box 26 after member 40 has been locked in place with locking pin 49.

Alternatively jack 74 can be pivotably attached to top plate 32 of anchor box 26 and top plate 46 of retainer member 40 in any conventional manner (not shown). With this arrangement retainer member 40 would be free to pivot without jack 74 being first removed from anchor box 26.

The invention has been described by reference to specific and preferred embodiments. It will be apparent, however, that many modifications can be made without departing from the spirit and scope of the invention. Accordingly, this invention should be construed not to be limited to the embodiment herein described but should be limited only by the scope of the appended claims.

What is claimed:

1. A tandem suspension system for a trailer comprising, in combination;
    a vertically variably positionable retainer member pivotably attached to said trailer;
    a forward rocker arm pivotably attached at one end to said retainer member and extending forwardly in the direction of the forward movement of said trailer;
    a rearward rocker arm pivotably attached at one end to said retainer member and extending generally in the direction of rearward movement of said trailer, both said forward and said rearward rocker arms pivotable in a plane parallel to the length of said trailer;
    a forward wheel rotatably attached to said forward rocker arm adjacent the end of said arm opposite the end attached to said retainer member;
    a rearward wheel rotatably attached to said rearward rocker arm adjacent the end of said arm opposite the end attached to said retainer member, both said forward and said rearward wheels being supported in a common plane parallel to the length of said trailer; and
    spring means retained by said retainer member and engaging said forward and rearward rocker arms to resiliently support said trailer relative to said forward and rearward wheels.

2. A tandem suspension system for a trailer comprising, in combination;
    an anchor box affixed to said trailer;
    a vertically variably positionable retainer member pivotably attached to said anchor box;
    a forward rocker arm pivotably attached at one end to said retainer member and extending generally in the direction of forward movement of said trailer;
    a rearward rocker arm pivotably attached at one end to said retainer member and extending generally in the direction of rearward movement of said trailer, both said forward and said rearward rocker arms pivotable in a plane parallel to the length of said trailer;
    a forward wheel rotatably attached to said forward rocker arm adjacent the end of said arm opposite the end attached to said retainer member;
    a rearward wheel rotatably attached to said rearward rocker arm adjacent the end of said arm opposite the end attached to said retainer member, both said forward and said rearward wheels being supported in a common plane parallel to the length of said trailer; and an elongated spring means supported substantially at the center thereof by said retainer member at a point above and equidistant from the point of attachment of said forward and rearward rocker arms to said retainer member, said spring means extending forwardly and rearwardly of said retainer member to engage said rocker arms adjacent said forward and rearward wheels to resiliently support said trailer relative to said wheels.

3. A tandem suspension system for a trailer according to claim 2 wherein said anchor box is substantially inverted U-shaped and consists of two parallel and horizontally offset vertical plates connected at their upper extremity by a horizontal top plate, each of said vertical plates being provided interiorly with a vertical guiding groove for receiving therein a tubular extension of said retainer member for guiding said retainer member as it moves vertically between said vertical plates, each of said vertical plates being provided with at least one perforation located centrally with said guiding groove for receiving therethrough a locking means for coacting with said tubular extension to releasably attach said retainer member to said anchor box.

4. A tandem suspension system for a trailer comprising, in combination;

a substantially inverted U-shaped anchor box affixed to said trailer, said anchor box having two parallel vertical side plates connected together at their upper extremity by a horizontal top plate, said side plates being provided interiorly with matching vertical guide grooves, each of said side plates being provided with a plurality of vertically spaced perforations located centrally of said guide grooves;

a retainer member slidably received between said side plates, said retainer member being provided with two oppositely directed extensions that slidably reside, one each, in said guide grooves to restrict movement of said retainer member in a vertical direction;

means for locking said retainer member between said side plates in such a manner that said retainer member is pivotal in a plane parallel to the length of said trailer;

a forward rocker arm pivotably attached at one end to said retainer member and extending generally in the direction of forward movement of said trailer;

a rearward rocker arm pivotably attached at one end to said retainer member and extending generally in the direction of rearward movement of said trailer, both said rocker arms being pivotable in a plane parallel to the length of said trailer;

a forward wheel rotatably attached forwardly on said forward rocker arm;

a rearward wheel rotatably attached rearwardly on said rearward rocker arm, both said wheels being supported in a common plane parallel to the length of said trailer;

an elongated spring means supported substantially at the center thereof by said retainer member, said spring means extending forwardly and rearwardly of said retainer member to engage said rocker arms to resiliently support said trailer relative to said forward and rearward wheels; and means extending between said top plate of said anchor box and said retainer member for varying the position of said retainer member relative to said anchor box.

No references cited.